United States Patent
Purontaus et al.

(10) Patent No.: US 7,983,661 B2
(45) Date of Patent: Jul. 19, 2011

(54) METHOD AND MEANS FOR CONTROLLING THE AVAILABILITY OF MOBILE AGENTS IN A CALL CENTRE ENVIRONMENT

(75) Inventors: Jouni Purontaus, Espoo (FI); Ville Salkala, Klaukkala (FI)

(73) Assignee: SAP AG, Walldorf (DE)

( * ) Notice: Subject to any disclaimer, the term of this patent is extended or adjusted under 35 U.S.C. 154(b) by 735 days.

(21) Appl. No.: 11/596,197

(22) PCT Filed: Aug. 5, 2005

(86) PCT No.: PCT/FI2005/000353
§ 371 (c)(1),
(2), (4) Date: Feb. 1, 2007

(87) PCT Pub. No.: WO2006/037836
PCT Pub. Date: Apr. 13, 2006

(65) Prior Publication Data
US 2008/0032679 A1 Feb. 7, 2008

(30) Foreign Application Priority Data
Oct. 8, 2004 (FI) .................................... 20041300

(51) Int. Cl.
*G06F 15/173* (2006.01)
*H04M 3/00* (2006.01)
(52) U.S. Cl. .................. 455/417; 379/265.09; 709/204; 709/224; 455/421; 455/450
(58) Field of Classification Search ........................ None
See application file for complete search history.

(56) References Cited

U.S. PATENT DOCUMENTS

| | | | |
|---|---|---|---|
| 5,684,870 A | 11/1997 | Maloney et al. | |
| 6,549,522 B1 | 4/2003 | Flynn | |
| 6,697,858 B1 * | 2/2004 | Ezerzer et al. | 709/224 |
| 6,785,380 B2 * | 8/2004 | Ribera | 379/265.09 |
| 6,829,349 B1 * | 12/2004 | Neale et al. | 379/265.09 |

(Continued)

FOREIGN PATENT DOCUMENTS
EP 09812544 2/2000
(Continued)

OTHER PUBLICATIONS

DEFINITY ECS Release 9.5 Guide to ACD Call Centers, Issue 4, Comcode 700015659, Jul. 2001, Avaya Communication.*

*Primary Examiner* — Jinsong Hu
*Assistant Examiner* — William Nealon
(74) *Attorney, Agent, or Firm* — Fish & Richardson P.C.

(57) ABSTRACT

Method and apparatus for controlling the ability of mobile agents to receive customer service calls to their mobile phone from a call center. A mobile station is installed with a client application featuring an agent profile and call processing rules that are updated from the call center. The mobile agent uses the mobile station for work by turning on a "work profile", and the client application registers the mobile agent to the call center. With the work profile on, the client application will block personal calls, or any other calls originating elsewhere than the call center. Significant advantages are accrued as the companies running the call centers will gain greater control of their mobile agent workforce and can prioritize tasks better within the organization, without having to construct complex solutions that consult different network elements within the cellular radio network.

38 Claims, 10 Drawing Sheets

U.S. PATENT DOCUMENTS

| | | | |
|---|---|---|---|
| 7,167,899 B2 * | 1/2007 | Lee et al. | 709/204 |
| 7,568,038 B1 * | 7/2009 | Ezerzer et al. | 709/227 |
| 2002/0025819 A1 * | 2/2002 | Cetusic et al. | 455/450 |
| 2002/0077876 A1 * | 6/2002 | O'Meara et al. | 705/8 |
| 2002/0181693 A1 * | 12/2002 | Ribera | 379/265.09 |
| 2003/0054864 A1 * | 3/2003 | Mergler | 455/566 |
| 2003/0093533 A1 * | 5/2003 | Ezerzer et al. | 709/227 |
| 2003/0187988 A1 * | 10/2003 | Lee et al. | 709/227 |

FOREIGN PATENT DOCUMENTS

| | | |
|---|---|---|
| WO | 0131472 | 5/2001 |
| WO | WO 02/15030 | 2/2002 |

\* cited by examiner

METHOD AND MEANS FOR CONTROLLING THE AVAILABILITY OF MOBILE AGENTS IN A CALL CENTRE ENVIRONMENT

TECHNICAL FIELD OF INVENTION

The invention relates to a method and means for controlling the availability of mobile agents in a call centre environment. In particular the invention relates to a method and means for controlling the availability of mobile agents to receive customer service calls to their mobile phone from a call centre.

BACKGROUND

Businesses today are more reliant on effective call centre services than ever before. An increasing amount of business is transacted to companies over the telephone every day, and call centres are presently the only viable solution to receive these transactions from the customers in a concerted and managed way. At the same time, both customers and the workforce of companies are becoming increasingly mobile.

Considering the aforementioned, the prior art naturally features methods with which customers can access call centres from mobile terminals and call centres can access a mobile workforce. US2002/0006787 A1, "Pocket Concierge and multimedia, wireless call centre system and method", presents a mobile application software and a call centre system that provides call centre based services to customers via a mobile application. However, this document does not address the mobility of agents providing the service. This document is cited as reference.

EP 1 185 064 A2, "Call Distribution in an intelligent network to mobile operators", features a method with which call centres can connect to their mobile workforce. Mobile operators, i.e. mobile customer service representatives are allocated with calls from a call centre. However, these mobile agents need to register in the HLR (Home location register) of the cellular network in order to receive calls and mobile network infrastructure nodes need to be consulted in allocating the calls. The method outlined in this document is thus dependent of underlying cellular GSM network components, which clearly is a great disadvantage. The HLR is already one of the most congested nodes in a cellular network, and any services requiring availability from the HLR or other network nodes are very tedious to design and implement. A further disadvantage is that the call centre operator is continuously dependent from the network operator providing the cellular service. This document is cited as reference.

U.S. Pat. No. 6,785,380 B2 "Network-centric self administered call centre with intelligent mobile agent terminals" features mobile agents equipped with Jini™ protocol mobile terminals are offered various general services in a heterogeneous system architecture. The architecture relies on new Jini™ protocol by Sun Microsystems. However, this disclosure does not provide any solutions to controlling the availability of mobile agents, a critical issue in the operation of any call centre employing mobile agents. Quite evidently this disclosure suffers from a serious drawback. This document is cited here as reference.

SUMMARY OF THE INVENTION

The invention under study is directed towards a system and a method for effectively controlling the availability of mobile agents in a call centre environment. A further object of the invention is to present a system and a method for effectively controlling the availability of mobile agents in a call centre environment independently of the mobile network operator providing the communication service.

One aspect of the invention involves an arrangement comprising a call centre, at least one mobile station and a client application installed on the mobile station. The mobile station is used by the mobile agent, who is a person such as a customer service representative or the like, who is intended to receive and answer customer calls. The customers call the call centre, which typically has a 0800 number or a like wireline or wireless service number. The call centre forwards these calls to agents, some of whom are mobile agents equipped with the outlined mobile station and a client application. As the call is forwarded to the said mobile station the client application screens and processes it, for example by giving it priority over personal calls of the mobile agent or joins the call to a call queue, or forwards it further to another agent. The rules with which calls are processed may be propagated from the call centre server, or the rules may be modified, for example parameters may be given with a user interface to the client application via the mobile station.

According to another aspect of the invention mobile agent may register himself to a call centre to receive calls. The client application may register the mobile agent automatically, and begin to screen incoming calls. In some embodiments the incoming calls are assigned a priority based on certain parameters, such as time when the call was made, the originating number of call or the like. For example, the client application may assign the highest priority to key customers, the second highest priority to calls originating from a certain call centre or another number and the lowest priority to personal calls. The client application feeds the incoming contacts to the mobile agent in the order of priority and thus, the mobile agent is automatically able to process the assignments of greatest importance with most immediate urgency. Quite clearly priority categories and call processing rules may be modified or updated from the call centre, mobile station or both in some embodiments.

A method for controlling the availability of a mobile agent in accordance with the invention comprises at least one mobile station, at least one call centre server and is characterised in that,
  at least one client application is installed on the mobile station,
  at least one client application and/or the call centre server control the availability of at least one mobile agent to receive calls.

An arrangement for controlling the availability of a mobile agent in accordance with the invention comprises at least one mobile station, at least one call centre server and is characterised in that,
  at least one client application is installed or arranged to be installed on at least one mobile station,
  at least one client application and/or the call centre server are arranged to control the availability of at least one mobile agent to receive calls.

A memory unit comprising a software program product for controlling the availability of a mobile agent in accordance with the invention comprises at least one client application arranged to be installed on a mobile station, the client application being arranged to wirelessly communicate data with at least one call centre server software and is characterised in that,
  the client application is arranged to control the availability of the mobile agent to receive calls from at least one call centre.

A memory unit comprising a software program product for controlling the availability of a mobile agent in accordance with the invention comprises at least one call centre server software arranged to wirelessly communicate data with at least one client application installed on a mobile station and is characterised in that, the call centre server software is arranged to control the availability of the mobile agent to receive calls by controlling the client application on the mobile station of the said mobile agent.

Quite clearly significant advantages are accrued by the invention to all stakeholders. The customers get better service as the capacity of call centres is increased through improved efficiency in handling the calls. The agents or customer service representatives are able to enjoy greater mobility and freedom in their work, as they may register to work without being necessarily physically at the call centre. The companies running the call centres will gain greater control of their mobile agent workforce and can prioritise tasks better within the organisation, without having to construct complex solutions that consult different network elements in the cellular radio network.

In addition and with reference to the aforementioned advantage accruing embodiments, the best mode of the invention is considered to involve a mobile station installed with a client application featuring an agent profile and call processing rules that are updated from the call centre. The mobile agent uses the mobile station for work by turning on a "work profile", and the client application registers the mobile agent to the call centre. With the work profile on, the client application will block personal calls, or any other calls originating elsewhere than the call centre. Blocking can be done by the client application by producing a "busy" signal programmatically or by directing the blocked calls to an answering machine.

BRIEF DESCRIPTION OF THE DRAWINGS

In the following the invention will be described in greater detail with reference to exemplary embodiments in accordance with the accompanying drawings, in which FIG. 1A demonstrates an embodiment of the inventive method 10 as a flow diagram FIG. 1B demonstrates a more detailed embodiment of the inventive method 11 as a flow diagram FIG. 2 demonstrates an embodiment of the inventive method 20 from a call centre perspective as a flow diagram FIG. 3 demonstrates an embodiment of the inventive method 30 from a mobile agent perspective as a flow diagram FIG. 4 demonstrates an embodiment 40 of the communication network and elements in accordance with the invention as a block diagram FIG. 5 demonstrates an embodiment 50 of the call centre server accordance with the invention as a block diagram FIG. 6 demonstrates an embodiment 60 of the mobile station in accordance with the invention as a block diagram FIG. 7 demonstrates an embodiment 70 of the memory unit comprising a client application in accordance with the invention as a block diagram FIG. 8 demonstrates an embodiment 80 of the memory unit comprising call centre server software in accordance with the invention as a block diagram.

Some of the embodiments are described in the dependent claims.

DETAILED DESCRIPTION OF EMBODIMENTS

Figure 1A:
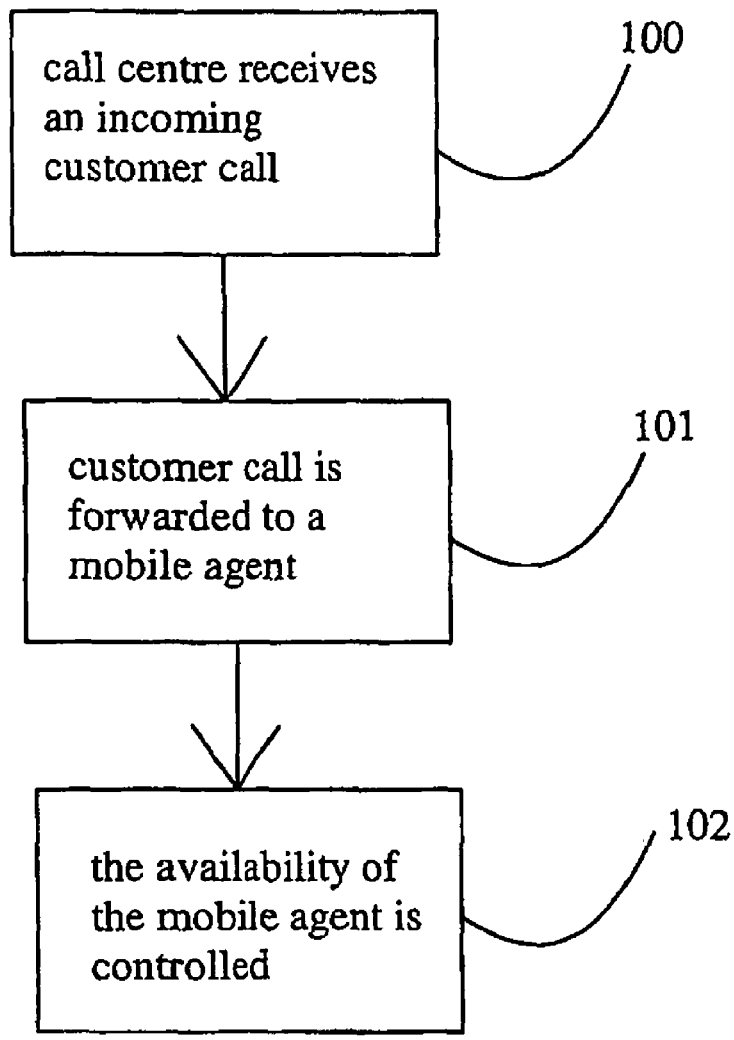

In phase 100 of FIG. 1A the call centre receives an incoming customer call. The call centre typically has a wireline or wireless 0800 number, to which a call centre server is connected. The call centre server employs at least one or several lines to handle the incoming calls. The call centre server is typically a computer that connects the incoming calls from the inbound lines to agents, who may be at the call centre facility or mobile agents. In phase 101 the call is forwarded to a mobile agent.

In phase 102 at least one client application and/or the call centre server controls the availability of the mobile agent to receive calls. This may happen in a multitude of ways, for example by blocking unwanted calls, maintaining a call queue, giving priority to certain calls, producing a programmatic busy signal to certain calls, producing a programmatic unavailable to certain calls, connecting to next agent, returning call to call centre, placing in queue, assigning certain priority, moving call in call queue, and the like.

Quite clearly any permutation of phases 100, 101 and 102 is possible and in accordance with the invention.

Figure 1B:
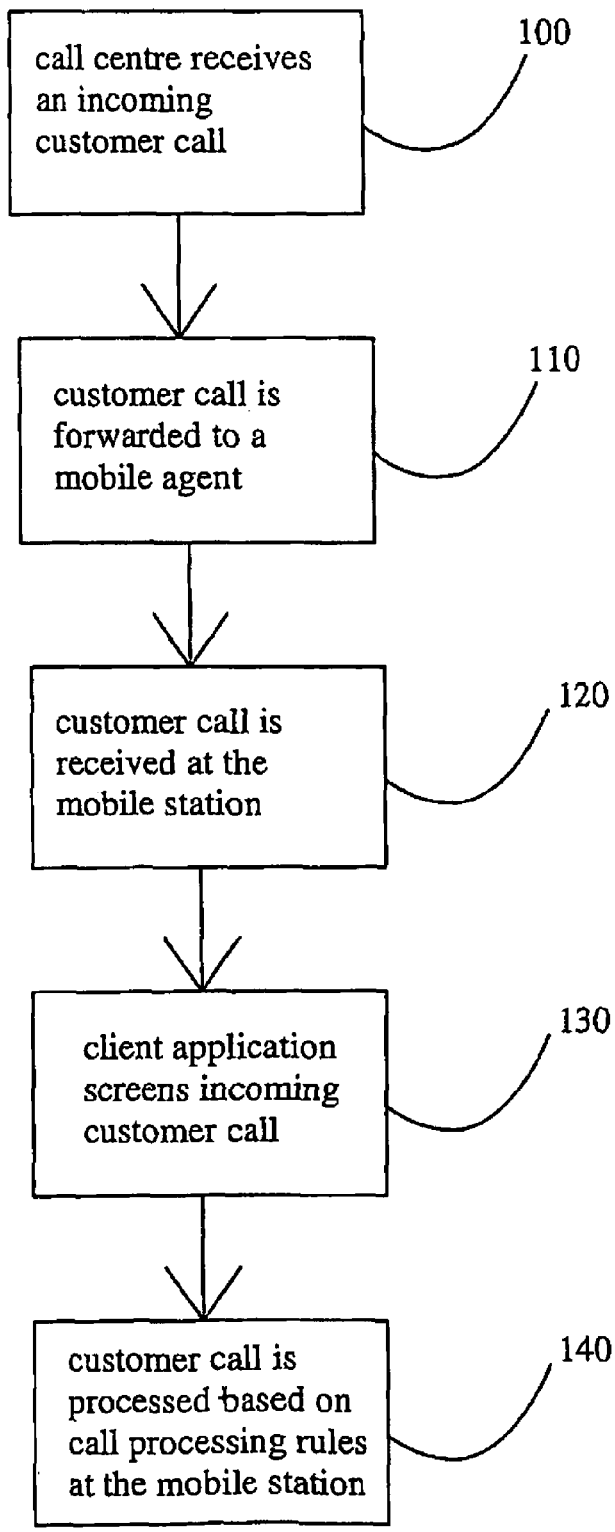

In phase 100 of FIG. 1B the call centre receives an incoming customer call. The call centre typically has a wireline or wireless 0800 number, to which a call centre server is connected. The call centre server employs at least one or several lines to handle the incoming calls. The call centre server is typically a computer that connects the incoming calls from the inbound lines to agents, who may be at the call centre facility or mobile agents. In some embodiments the call centre server comprises any of the following: at least one database server, at least one disk array, at least one gateway server, at least one application server, at least one external phone centre, at least one virtual phone and/or at least one SIP (Session Initiation Protocol) and/or H.323 phone. The call centre may be any computerised facility designed to receive and handle incoming customer calls, for example a helpdesk-, reservation- or CRM (Customer Relationship Management)-facility.

In phase 110 the customer call is forwarded to a mobile agent. Mobile agent is typically an employee of the organisation that the call centre facility is serving, such as a customer service representative or a like person equipped with a mobile station and a wireless communication connection thereto. In some embodiments the mobile station is a GSM-, GSM-data, IP-RAN-, UMTS-, WAP-, Teldesic-, Inmarsat-, Iridium-, GPRS-, CDMA-data-, WCDMA-data-, HTTP-, H.323-, SMS-, MMS-, email-LAN-, TCP/IP-, imode-, Globalstar- and/or WLAN-compliant mobile phone, PDA and/or a portable computer.

In phase 120 the customer call is received at the mobile station. As the call is incoming and received to the mobile station, the client application installed in the said mobile station screens the incoming customer call in phase 130. The client application is typically a software application that is installed in the mobile station and designed to run under the operating system of the said mobile station. For example the client application can be a client application to a Symbian™ operating system or a Microsoft™ operating system. During screening the client application inspects all or some of the attributes of the incoming phone call. In some embodiments the originating telephone number, caller ID, current time, time of last call from same number, match in the "Contacts" directory of the mobile station, or any other attributes are screened.

In phase 140 the customer call is processed based on call processing rules at the mobile station. In some embodiments, the attributes of the incoming call affect the processing. For example, in some embodiments calls from a call centre are always let through, unless the mobile agent is busy with a call from the same call centre. If the mobile agent is busy with another caller, this caller is cut off by generating a programmatic "busy" or unavailable signal, and the incoming customer call from the call centre is passed through to be serviced by the mobile agent.

In some embodiments, the client application contains a rule or a set of at least one rule for processing incoming and outgoing calls to and from the mobile station. Sometimes at least one rule is fixed, and/or at least one rule is modifiable and/or updateable. The call centre server manages the said rules stored in the client application by communicating wirelessly with the mobile station and the said client application. In some embodiments it is also possible to modify the rules and parameters related to the rules from the user interface of the mobile station and/or client application, and in some embodiments the rules are simply stored in the client application and/or mobile station. In some embodiments the client application defines incoming calls to certain categories and processes said incoming calls with rules assigned to the said category. The client application is also capable of blocking incoming and/or outgoing calls in some embodiments.

In one preferred embodiment of the invention, the client application features different profiles that contain different processing rules for incoming and outgoing calls. For example processing rules of 140 may define different actions, such as programmatic busy signal, programmatic unavailable, connect to next agent, return call to call centre, place in queue, assign certain priority, move in call queue, and the like. The actions are defined for a certain condition that the incoming call needs to fulfil, for example calls fulfilling a certain condition or belonging to a category defined by some conditions may initiate an action. For example in a "work" profile the client application may assign the highest priority to key customers, the second highest priority to calls originating from a certain call centre or another number and the lowest priority to personal calls, or simply just let calls through from the call centre and block calls from other numbers.

Any rules, examples, actions, categories, orders of priority, profiles and the like explained in association with methods 10, 20 and 30 are also applicable with method 11. Quite clearly methods 10, 11, 20, 30 and any of their phases may be permuted in accordance with the invention.

Figure 2:
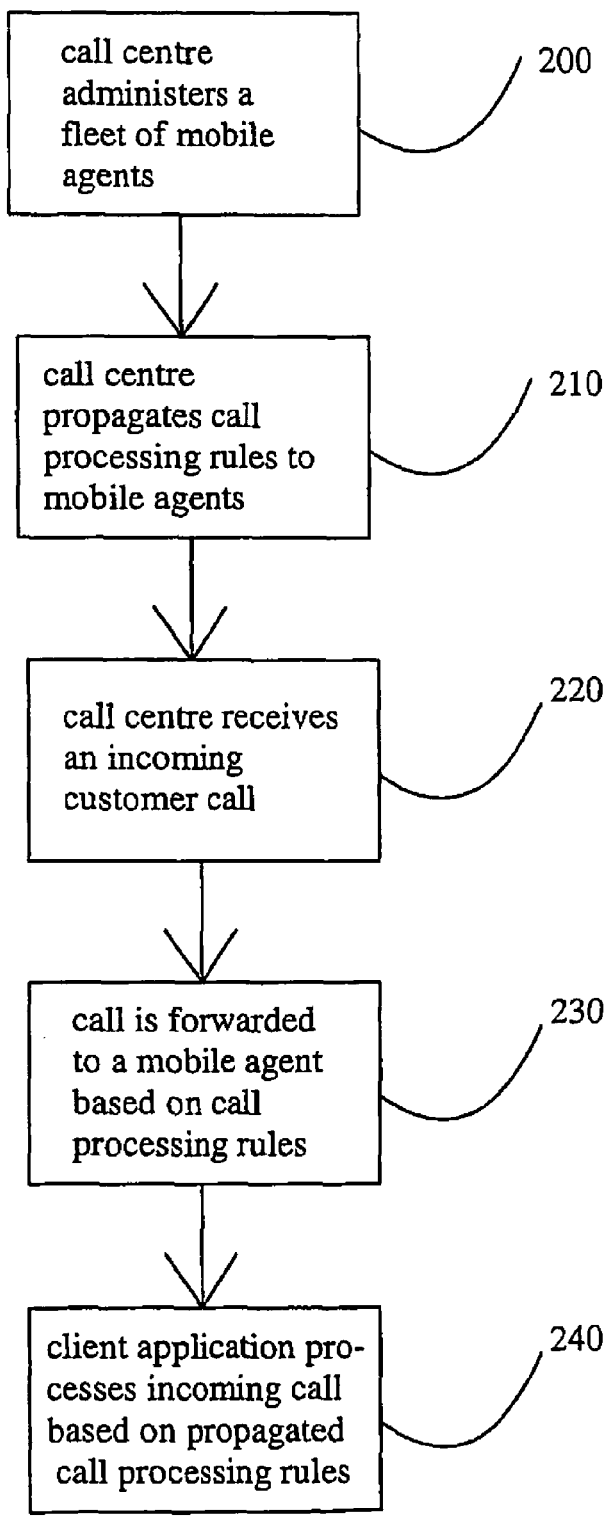

In phase 200 of FIG. 2 the call centre administers a fleet of mobile agents. In some embodiments mobile agents are accompanied also by "fixed agents" at the call centre facility. In phase 210 the call centre propagates call processing rules to mobile agents through a wireless or wireline communication connection. The call processing rules are preferably updated by simply transferring a file to the mobile station, which may be read by the client application.

In some embodiments all communication with the client applications and the call centre takes place via a wireless telephony or Internet connections, and is indifferent to any other communication from point of view of network elements. In other words, in many embodiments the communication between the mobile stations, client applications and call centre is not in the cellular radio layer, such as the GSM layer, but in the traffic layer of the network, such as a GSM-data file for example.

In phase 220 the call centre receives an incoming customer call. In phase 230 the call is passed onto a mobile agent based on call processing rules. In some embodiments the call centre features a diverse array of call processing rules, which may be similar or dissimilar to call processing rules used in the client application. For example, the call centre may forward customer calls to mobile agents based on their skills, customer accounts, language skills, demanded skills, skill levels, call priority, service level requirement, caller category, or any other aspects in the personal and/or professional profile of the mobile agent or the calling customer. Quite clearly the call centre may apply any rules, categories, orders of priority, profiles, or any other means to process the call that have been previously described.

In phase 240 the client application processes the incoming call based on propagated call rules. In some embodiments the client application passes calls through always from at least one certain specified number, for example the number of the call centre. In other embodiments the client application also hangs up intermittent phone calls and passes calls through from the call centre server. In further embodiments the client application and/or the call centre server may maintain a call queue.

Any rules, examples, actions, categories, orders of priority, profiles and the like explained in association with methods 10, 11 and 30 are also applicable with method 20. Quite clearly methods 10, 11, 20, 30 and any of their phases may be permuted in accordance with the invention.

Figure 3:
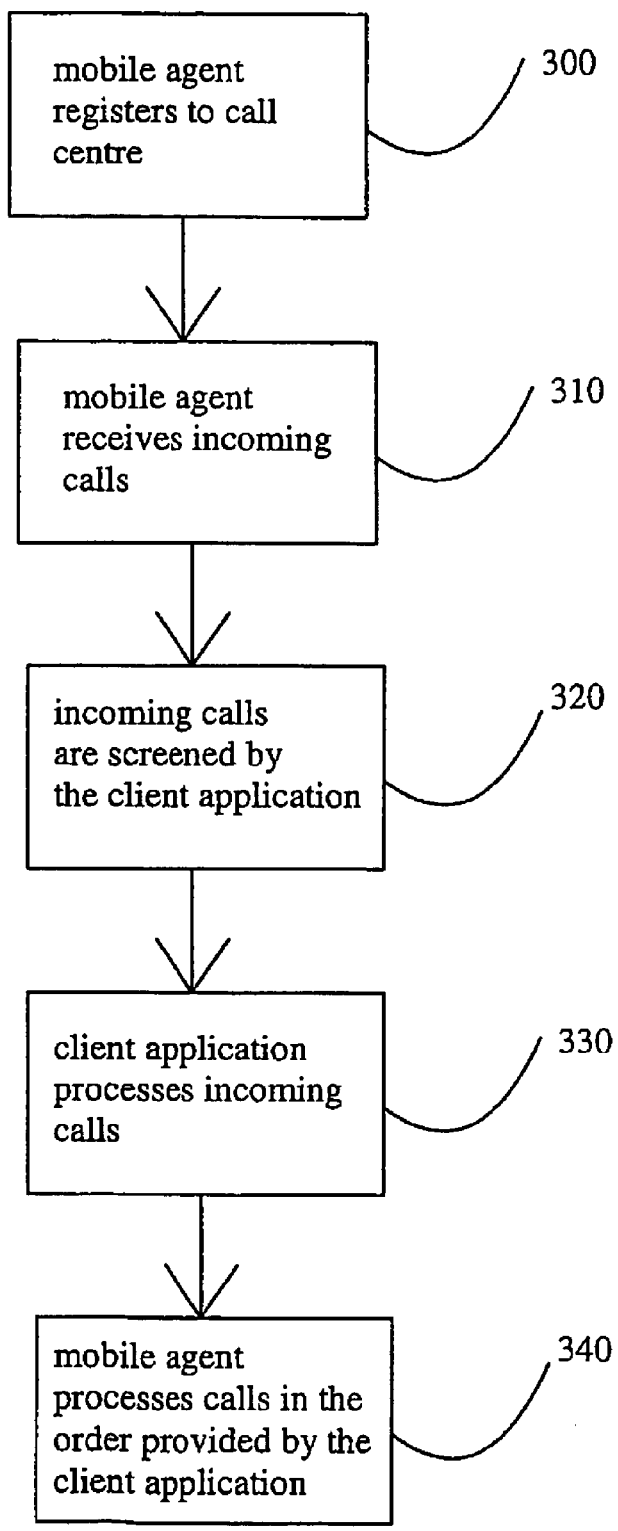

In phase 300 of FIG. 3 the mobile agent registers to a call centre. It is possible and in accordance with the invention that a mobile agent may register to many different call centres, sometimes even so that a particular mobile agent is registered to more than one call centre at the same time. In phase 310 the mobile agent receives incoming calls. In some embodiments the mobile agent is receiving both personal and business calls or any conceivable calls.

In phase 320 the incoming calls are screened by the client application installed on the mobile station. In some embodiments the originating telephone number, caller ID, current time, time of last call from same number, match in the "Contacts" directory of the mobile station, or any other attributes are screened. In phase 330 the client application processes incoming calls, based on extracted attributes and call processing rules, categories, order of priority or the like. The client application may take different actions, such as programmatic busy signal, programmatic unavailable, connect to next agent, return call to call centre, place in queue, assign certain priority, move in call queue, and the like. In some embodiments the client application and/or the call centre server analyses the priority of incoming calls in a call queue, and processes the incoming calls to the said mobile agent in the order of priority. Quite clearly the call centre server and the client application may be in a continuous communication connection when the mobile agent is receiving incoming calls, and the call centre or the client application may process the incoming calls. In phase 340 the mobile agent processes calls in the order provided by the client application.

In some embodiments it is possible that the answering and/or processing order of calls is provided by the call centre server, or that the call centre server intervenes at least in part in the processing and/or answering order of calls.

Any rules, examples, actions, categories, orders of priority, profiles and the like explained in association with methods 10, 11 and 20 are also applicable with method 30. Quite clearly methods 10, 11, 20, 30 and any of their phases may be permuted in accordance with the invention.

Figure 4:
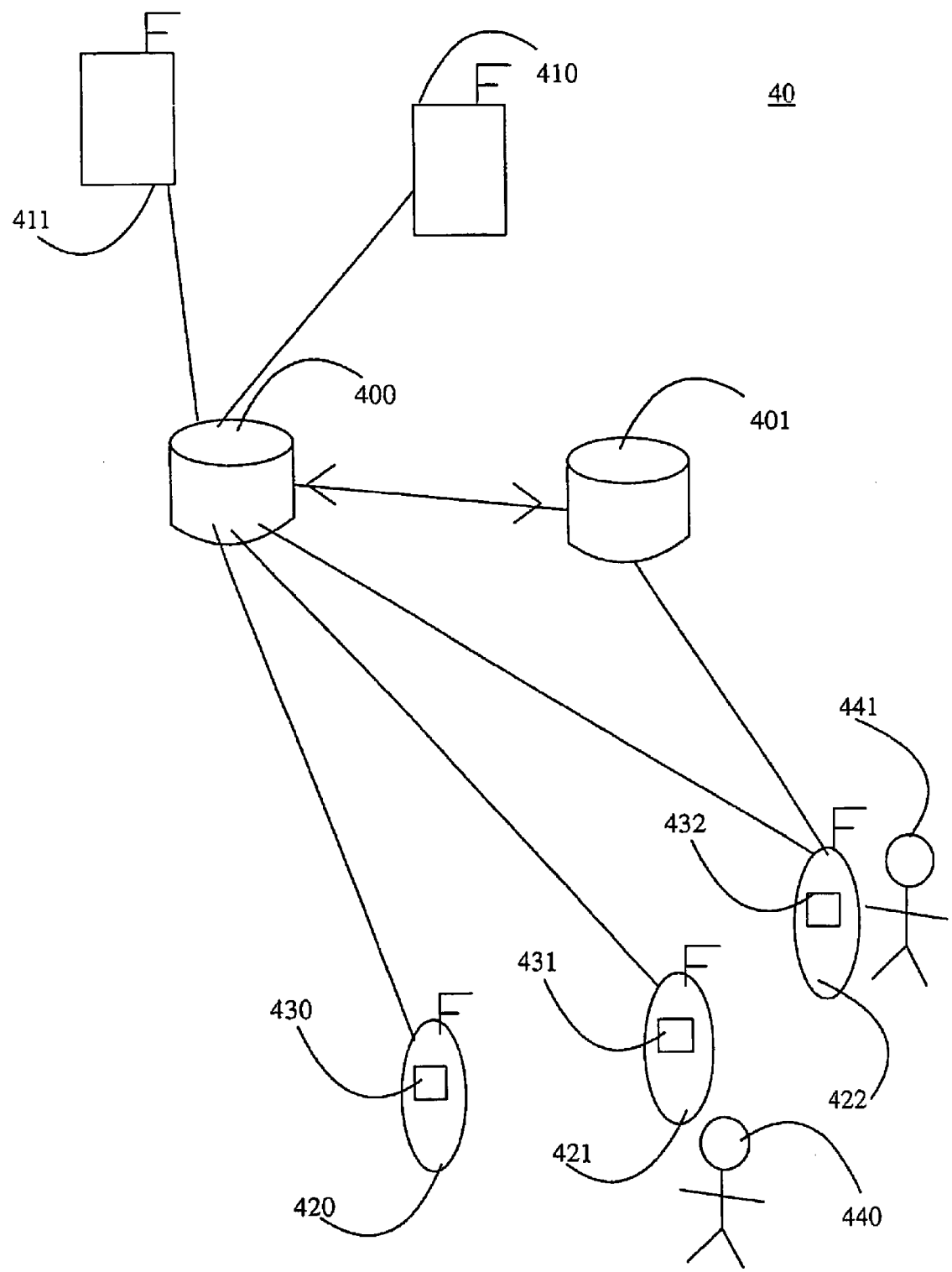

FIG. 4 presents an arrangement for controlling the availability of at least one mobile agent 440, 441 equipped with at least one mobile station 420, 421, 422 and at least one client application 430, 431, 432 installed on the mobile station. At least one call centre server 400, 401, and at least one client application 430, 431, 432 are arranged to wirelessly communicate data. At least one client application 430, 431, 432 and/or the call centre server 400, 401 are arranged to control the availability of the mobile agent 440, 441 to receive calls from customer telephones 410, 411.

In one embodiment the client application is arranged 430, 431, 432 to contain a rule or a set of at least one rule for processing incoming and outgoing calls to and from the mobile station 420, 421, 422. Sometimes at least one rule is fixed, and/or at least one rule is modifiable and/or updateable. The call centre server 400, 401 is arranged to manage the said rules stored in the client application 430, 431, 432 by communicating wirelessly with the mobile station 420, 421, 422 and the said client application. These rules may also be modified via a user interface in the mobile station 420, 421, 422 or client application 430, 431, 432.

In some embodiments the client application 430, 431, 432 is arranged to programmatically produce a busy signal to an unwanted incoming call. In further embodiments the client application 430, 431, 432 is arranged to define incoming calls to certain categories and process said incoming calls with rules assigned to the said category. In addition it is possible that the client application 430, 431, 432 is arranged to feature different profiles that contain different processing rules for incoming and outgoing calls.

In many embodiments the client application 430, 431, 432 is arranged to block incoming and/or outgoing calls. Sometimes the client application 430, 431, 432 is arranged to pass calls through always from at least one certain specified number, for example the call centre server 400, 401 number. This may be the setting especially when the mobile agent 440, 441 has chosen a "work" profile that blocks all personal calls and calls that are not related to work. In further embodiments the client application 430, 431, 432 is even arranged to hang up intermittent phone calls and pass calls through from the call centre server 400, 401.

In some embodiments the client application 430, 431, 432 and/or the call centre server 400, 401 is arranged to maintain a call queue. Sometimes the client application 430, 431, 432 and/or the call centre server 400, 401 is arranged to analyse the priority of incoming calls in the said call queue, and arranged to process the incoming calls to the said mobile agent 440, 441 in the order of priority.

Figure 5:
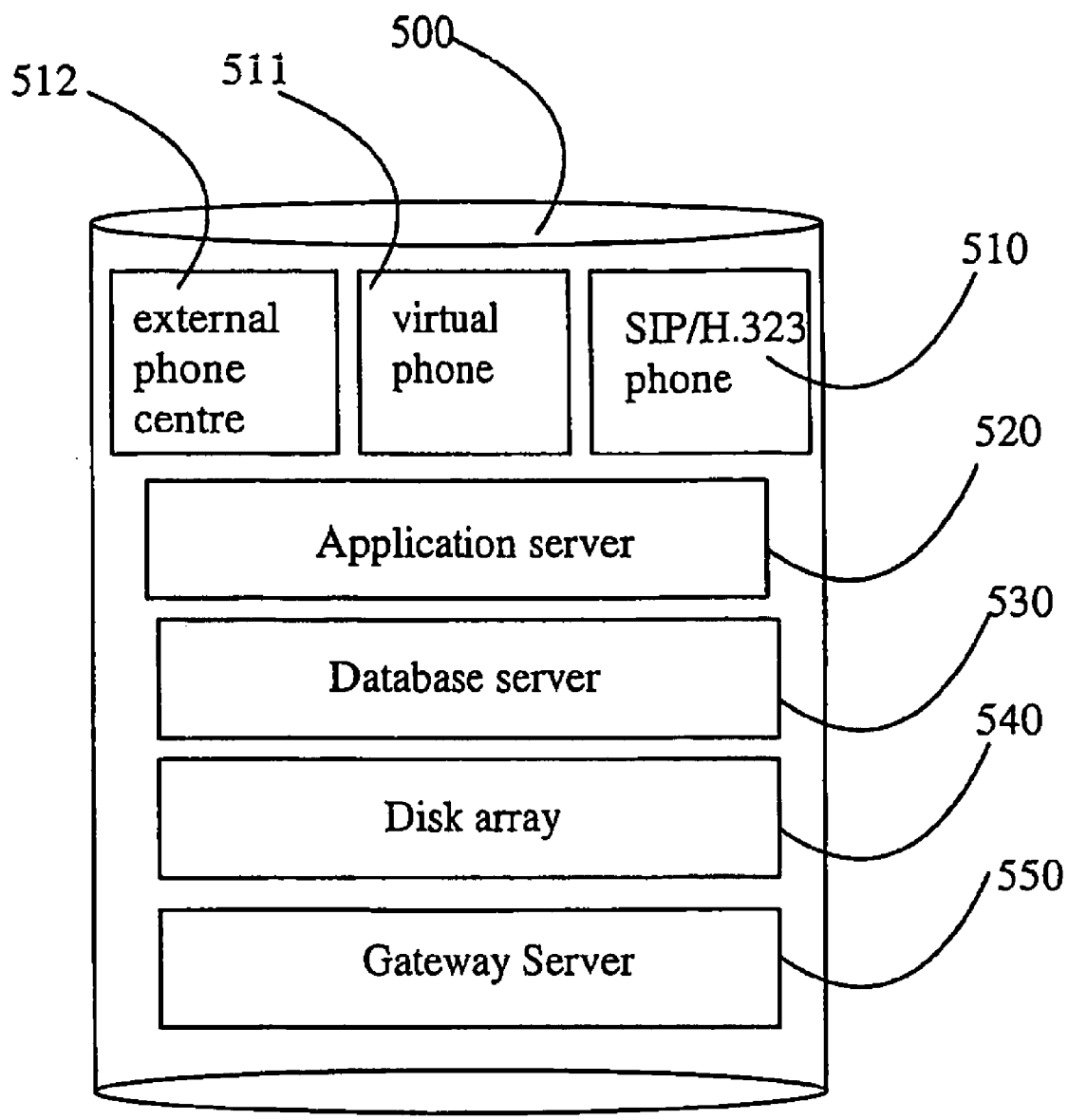

FIG. 5 presents an embodiment 50 of a call centre server. The call centre server 500 is typically a PC- or a Unix-server computer or an array of said computers. The call centre typically has a wireline or wireless 0800 number, to which at least one call centre server 500 is connected. The call centre server 500 is arranged to employ at least one or several lines to handle the incoming calls. The call centre server 500 is typically a computer that connects the incoming calls from the inbound lines to agents, who may be at the call centre facility or mobile agents.

In some embodiments the call centre server 500 comprises any of the following: at least one database server 530, at least one disk array 540, at least one gateway server 550, at least one application server 520, at least one external phone centre 512, at least one virtual phone 511 and/or at least one SIP and/or H.323 phone 510. The call centre server 500 may be installed in any computerised facility designed to receive and handle incoming customer calls, for example a helpdesk-, reservation- or CRM (Customer Relationship Management)-facility.

Figure 6:
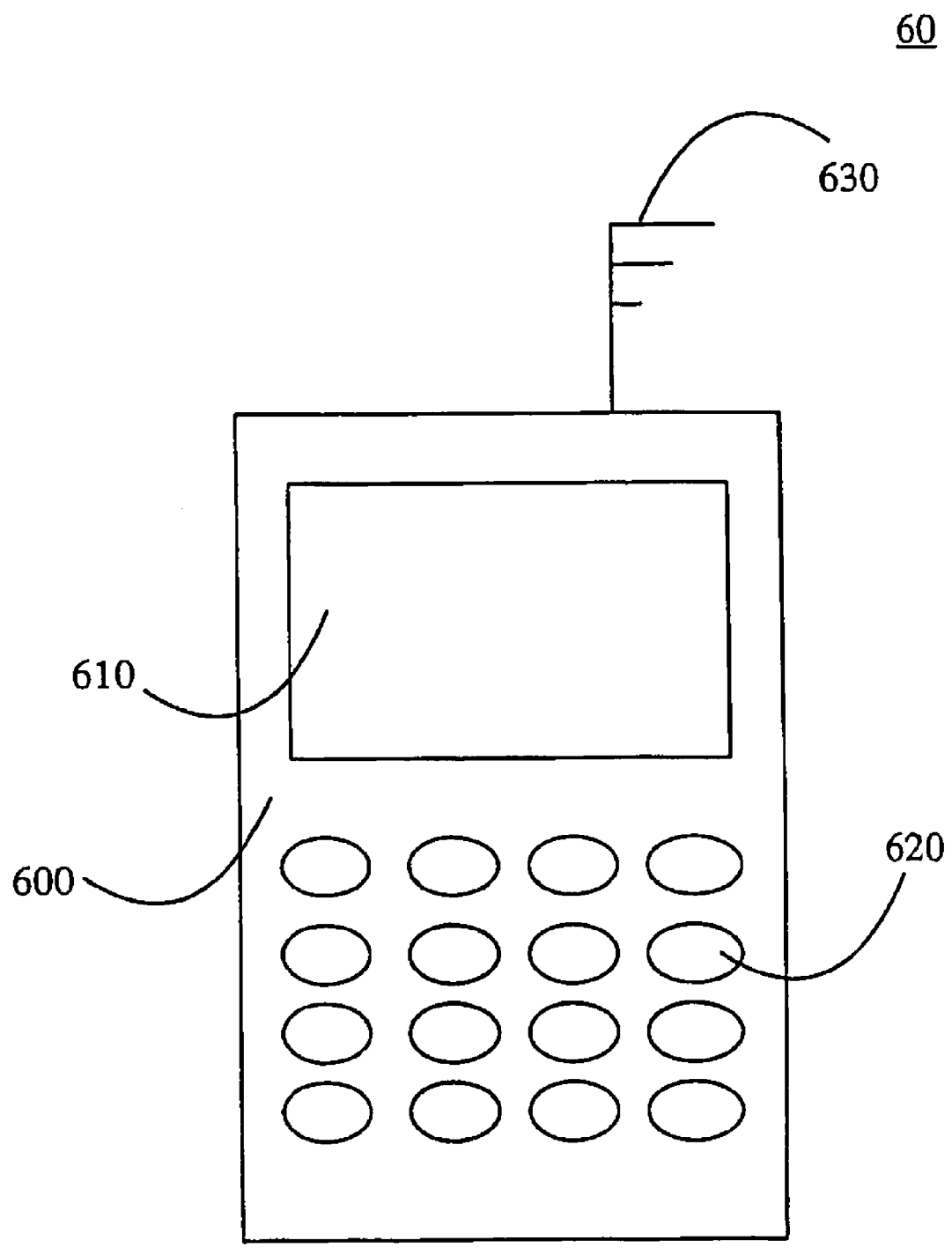

FIG. 6 displays an embodiment of a mobile station 60 in accordance with the invention. The mobile station 600 is typically a GSM-, GSM-data, IP-RAN-, UMTS-, WAP-, Teldesic-, Inmarsat-, Iridium-, GPRS-, CDMA-data-, WCDMA-data-, HTTP-, H.323-, SMS-, MMS-, email-LAN-, TCP/IP-, imode-, Globalstar- and/or WLAN-compliant mobile phone, PDA and/or a portable computer. In many embodiments it comprises at least one radio connection 630, at least one display 610 and some means of input 620, for example a keyboard or a touchpad.

The mobile station has memory and/or disk space in which to store and install software applications. The client application in accordance with the invention is typically a software application that is installed in the mobile station and designed to run under the operating system of the said mobile station. For example the client application is a client application to a Symbian™ operating system or a Microsoft™ operating system in some embodiments.

Figure 7:
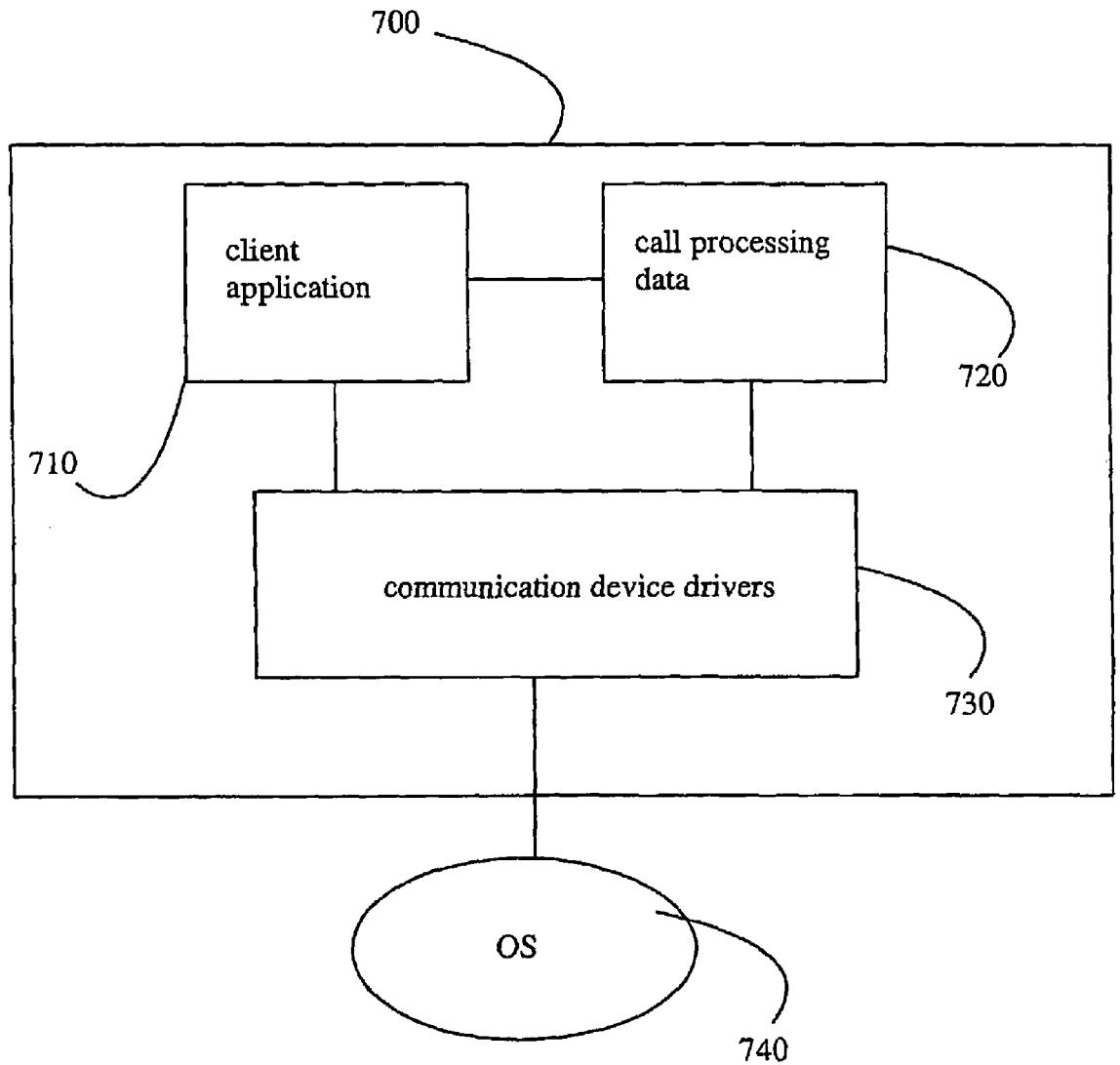

FIG. 7 displays an embodiment of a memory unit 70 comprising a software program product for controlling the availability of a mobile agent. At least one client application 710 is arranged to be installed on a mobile station, and the client application 710 is arranged to wirelessly communicate data with at least one call centre server software. The client application 710 is arranged to control the availability of the mobile agent to receive calls from at least one call centre.

In many embodiments the client application 710 and the communication device drivers 730 are GSM-, GSM-data, IP-RAN-, UMTS-, WAP-, Teldesic-, Inmarsat-, Iridium-, GPRS-, CDMA-data-, WCDMA-data-, HTTP-, H.323-, SMS-, MMS-, email-, LAN-, TCP/IP-, imode-, Globalstar- and/or WLAN-compliant software applications. The client application 710 in accordance with the invention is typically a software application that is installed in the mobile station and designed to run under the operating system 730 of the mobile station to which it is installed. The client application 710 is a client application to a Symbian™ operating system or a Microsoft™ operating system in some embodiments.

In many embodiments the client application 710 contains a rule or a set of at least one rule for processing incoming and outgoing calls to and from the mobile station. Sometimes at least one rule is fixed, and/or at least one rule is modifiable and/or updateable. For example, the client application is arranged to programmatically produce a busy signal to an unwanted incoming call. In some embodiments the client application is arranged to define incoming calls to certain categories and process said incoming calls with rules assigned to the said category. In even further embodiments the client application is arranged to feature different profiles that contain different processing rules for incoming and outgoing calls. Call processing rules, profiles, categories, directory information, interfaces to other call management software such as contacts directory or any other directory, contact data is arranged to be stored in call processing data 720 in some embodiments.

Likewise some embodiments of the client application 710 are arranged to block incoming and/or outgoing calls in the mobile station. For example, the client application 710 is arranged to pass calls through always from at least one certain specified number, for example the call centre server. Even further, the client application 710 is arranged to hang up intermittent phone calls and pass calls through from the call centre server in some embodiments.

Upon several incoming calls, the client application 710 is arranged to maintain a call queue in some embodiments. Consequently the client application 710 is arranged to analyse the priority of incoming calls in the said call queue, and process the incoming calls to the said mobile agent in the order of priority.

Figure 8:
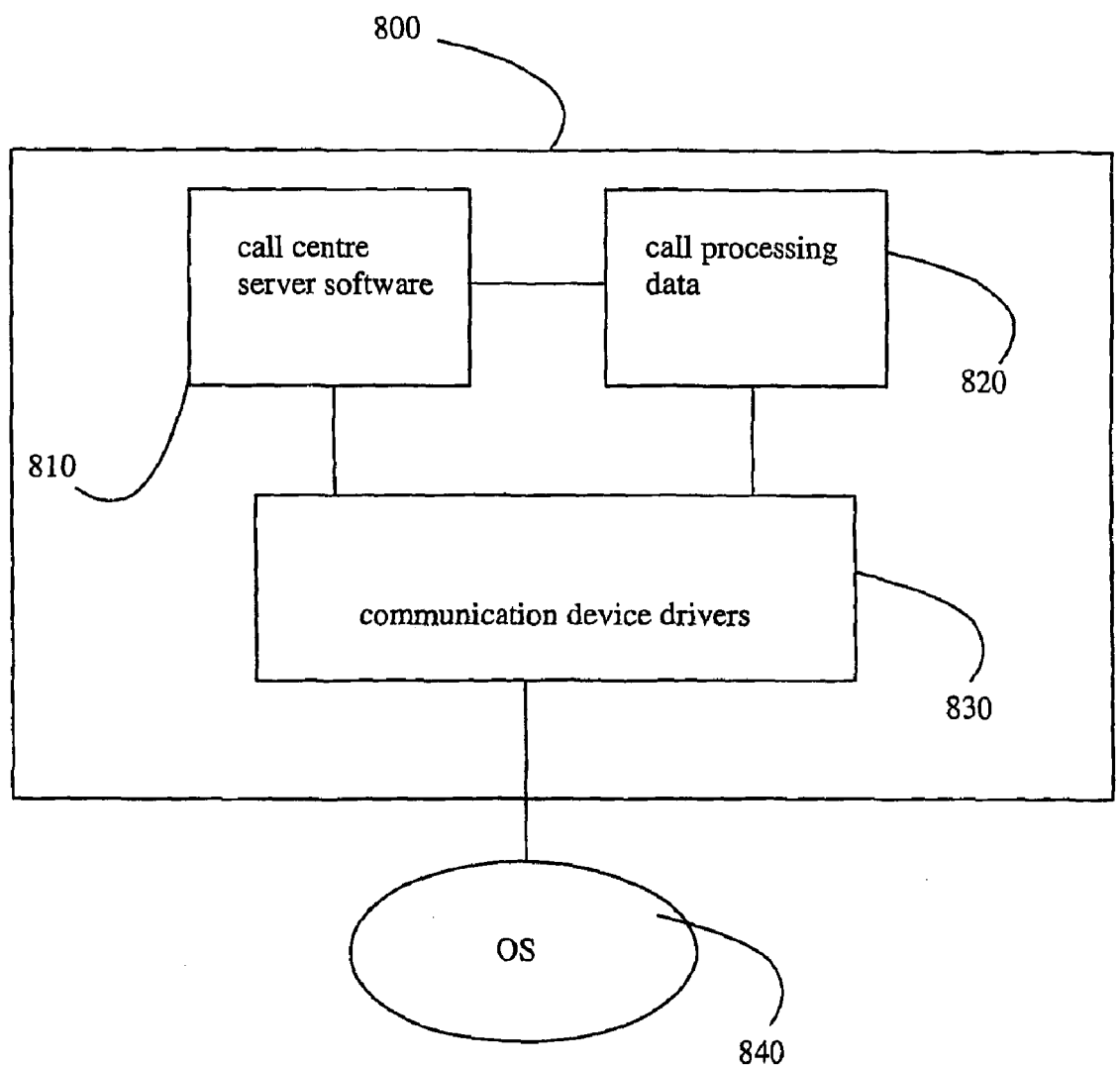

FIG. 8 displays an embodiment of a memory unit 80 in accordance with the invention, comprising a software program product for controlling the availability of a mobile agent. At least one call centre server software 810 is arranged to wirelessly communicate data with at least one client application 710 installed on a mobile station. The call centre server software 810 is arranged to control the availability of the mobile agent to receive calls, by controlling the client application on the mobile station of the said mobile agent. Call centre software 810 is an application in some embodiments, designed to run under the operating system 840. Call processing rules, profiles, categories, directory information, interfaces to other call management software such as contacts directory or any other directory, contact data is arranged to be stored in call processing data 820 in some embodiments.

In some embodiments the call centre server software 810 is arranged to manage the rules stored in a client application by communicating wirelessly with the mobile station and the said client application. The call centre server software 810 is also arranged to maintain a call queue in some embodiments. Even further, the call centre server software 810 is arranged to analyse the priority of incoming calls in the said call queue, and process the incoming calls to the said mobile agent in the order of priority in some further embodiments of the invention.

The call centre server software 810 may comprise any of the following: database server software, disk array software, gateway server software, application server software, external phone centre software, virtual phone software and/or a SIP and/or H.323 phone software. Quite clearly software blocks 710, 720, 730, 740, 810, 820, 830, 840 may also be arranged to be stored in the same memory unit 700, 800.

Figure 9:
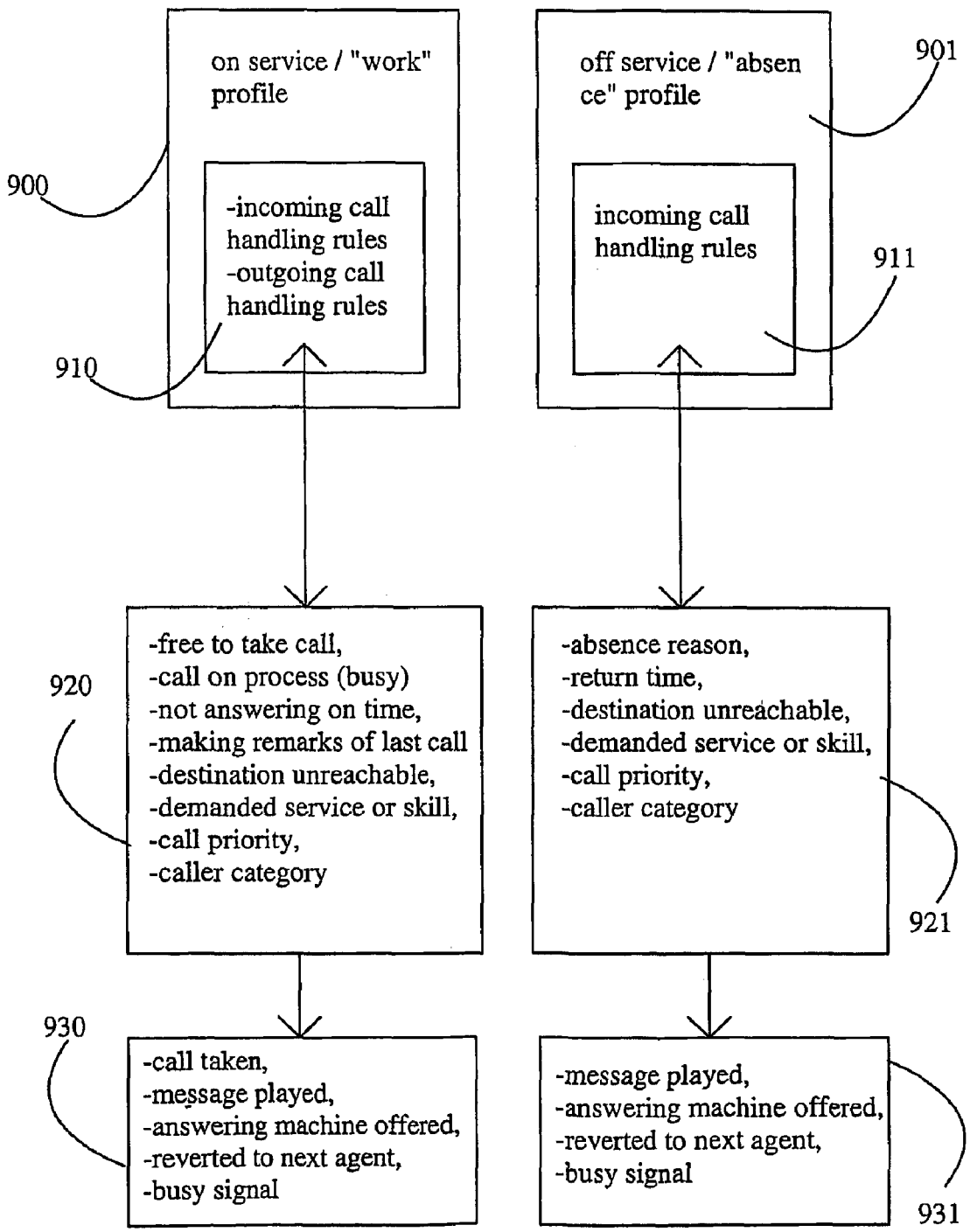
FIG. 9 demonstrates an embodiment 90 of the call processing method in accordance with the invention involving exemplary profiles, actions and rules as a schematic diagram.

FIG. 9 presents an exemplary embodiment of profiles, call processing rules, parameters and related actions as a schematic diagram. Profile 900 is a "work" profile or a "on service" profile, which essentially means that the mobile station 420, 421, 422, 600, client application 430, 431, 432 and thus the mobile agent 440, 441 are registered to receive customer calls 410, 411. Profile 901 is an "absent" profile or off service profile, where mobile agents 440, 441 are temporarily registered as unavailable to receive calls.

The call handling concerning a mobile agent 440, 441 in profile "work" 900 at the call centre 400, 401, 500 and the client application 430, 431, 432 comprises call processing rules 910, which sometimes apply for incoming calls, outgoing calls or both. The outcomes of applying call processing rules are influenced by parameters 920 which may be any of the following logical or technical states of the customer, agent 440, 441 and/or mobile station: free to take call, call on process (busy), not answering on time (e.g. within 20 seconds), making remarks of last call (paperwork/after work), destination unreachable (e.g. no radio coverage), demanded service or skill (e.g. Spanish speaker requested), call priority (e.g. call is an urgent request for an offer to be closed at a near time), caller category (e.g. the caller is a VIP customer).

The parameters 920 are then used by the call processing rules 910 to define actions to be taken 930. These actions may comprise any of the following: the agent takes the call and answers, a message played (e.g. call will be taken soon), answering machine offered to the customer for leaving a message and/or the call is reverted to the next agent 440, 441, generating a busy signal programmatically.

The call handling concerning a mobile agent 440, 441 in profile "absent" 901 at the call centre and the client application 430, 431, 432 comprises call processing rules 911, which usually apply for incoming calls. The outcomes of applying call processing rules 911 are influenced by parameters 921 which may be any of the following logical or technical states of the customer, agent 440, 441 and/or mobile station 420, 421, 422, 600: absence reason (e.g. out to lunch), return time (e.g. back on service at 1 pm), destination unreachable (e.g. no radio coverage), demanded service or skill (e.g. Spanish speaker requested), call priority (e.g. call is a general query that is not in a hurry), caller category (e.g. the caller is at level 3 for customer award points).

The parameters 921 are then used by the call processing rules 911 to define actions to be taken 931. These actions may comprise any of the following: a message played (e.g. "please call at 1 pm"), answering machine offered to the customer for leaving a message and/or the call is reverted to the next agent 440, 441, generating a busy signal programmatically.

Quite clearly, other profiles, call processing rules an actions may be defined in accordance with the invention.

The invention has been explained above with reference to the aforementioned embodiments and several commercial and industrial advantages have been demonstrated. The methods and arrangements of the invention allow significant advantages to all stakeholders. The customers get better service as the capacity of call centres is increased through improved efficiency in handling the calls. The agents or customer service representatives are able to enjoy greater mobility and freedom in their work, as they may register to work without being necessarily physically at the call centre. The companies running the call centres will gain greater control of their mobile agent workforce and can prioritise tasks better within the organisation, without having to construct complex solutions that consult different network elements in the cellular radio network.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

US2002/0006787 A1, "Pocket Concierge and multimedia, wireless call center system and method", Darby, George Eugene.

EP 1 185 064 A2, "Call Distribution in an intelligent network to mobile operators", Gilman, Stevens R.

U.S. Pat. No. 6,785,380 B2 "Network-centric self administered call center with intelligent mobile agent terminals", Ribera, John F.

The invention claimed is:

1. A method for controlling availability of a mobile agent, comprising a mobile station, a client application installed on the mobile station and a call centre server, the method comprising:
communicating data between the client application and the call centre server wirelessly or through a wireline connection,
controlling availability of the mobile agent to receive calls with the mobile station, and processing a call to the mobile station by:
  identifying, from among multiple, different profiles, a first profile set for the mobile station at a time when the call to the mobile station was received, each of the multiple, different profiles being associated with one or more call processing rules defined to control processing of calls received when the mobile station is set in the corresponding profile;
  accessing a first call processing rule associated with the first profile and defined to control processing of calls received when the mobile station is set in the first profile, the first call processing rule being different than a second call processing rule defined to control processing of calls received when the mobile station is set in a second profile that is different than the first profile;
  accessing one or more parameters that represent a state of a customer of the call centre server that is associated with the call to the mobile station and a state of the mobile station at a time when the call to the mobile station was received;
  applying the first call processing rule to the accessed one or more parameters to determine an action to be taken for the call to the mobile station; and
  performing the determined action on the call to the mobile station.

2. A method as claimed in claim 1, further comprising managing, by the call centre server call processing rules stored in the client application by communicating wirelessly with the mobile station and the said client application.

3. A method as claimed in claim 1, wherein performing the determined action on the call to the mobile station comprises programmatically producing a busy signal to the call.

4. A method as claimed in claim 1, further comprising defining, by the client application, incoming calls to certain categories and processing the incoming calls with rules assigned to the certain categories.

5. A method as claimed in claim 1, wherein performing the determined action on the call to the mobile station comprises blocking the call.

6. A method as claimed in claim 1, wherein the client application features different profiles that contain different processing rules for incoming and outgoing calls.

7. A method as claimed in claim 1, wherein the client application passes calls through always from at least one certain specified number.

8. A method as claimed in claim 1, wherein performing the determined action on the call to the mobile station comprises hanging up intermittent phone calls and passing calls through from the call centre server.

9. A method as claimed in claim 1, wherein the client application and/or the call centre server maintains a call queue.

10. A method as claimed in claim 1, wherein the client application and/or the call centre server analyses the priority of incoming calls in the said call queue, and processes the incoming calls to the mobile agent in the order of priority.

11. A method as claimed in claim 1, wherein the mobile station is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email-, LAN-, TCP/IP-, imode-, Globalstar- and/or WLAN-compliant mobile phone, PDA and/or a portable computer.

12. A method as claimed in claim 1, wherein the call centre server comprises any of the following: database server, disk array, gateway server, application server, external phone centre, virtual phone and/or a SIP and/or H.323 phone.

13. An arrangement for controlling availability of a mobile agent, comprising a mobile station, a client application installed or arranged to be installed on the mobile station, and a call centre server, wherein:
  the client application and the call centre server are arranged to communicate data wirelessly or through a wireline connection,
  the client application is arranged to control availability of the mobile agent to receive calls with the mobile station, and
  the client application is arranged to process a call to the mobile station by:
    identifying, from among multiple, different profiles, a first profile set for the mobile station at a time when the call to the mobile station was received, each of the multiple, different profiles being associated with one or more call processing rules defined to control processing of calls received when the mobile station is set in the corresponding profile;
    accessing a first call processing rule associated with the first profile and defined to control processing of calls received when the mobile station is set in the first profile, the first call processing rule being different than a second call processing rule defined to control processing of calls received when the mobile station is set in a second profile that is different than the first profile;
    accessing one or more parameters that represent a state of a customer of the call centre server that is associated with the call to the mobile station and a state of the mobile station at a time when the call to the mobile station was received;
    applying the first call processing rule to the accessed one or more parameters to determine an action to be taken for the call to the mobile station; and
    performing the determined action on the call to the mobile station.

14. An arrangement as claimed in claim 13, wherein the call centre server is arranged to manage rules stored in the client application by communicating wirelessly with the mobile station and the client application.

15. An arrangement as claimed in claim 13, wherein the client application is arranged to programmatically produce a busy signal to an incoming call.

16. An arrangement as claimed in claim 13, wherein the client application is arranged to define incoming calls to certain categories and process said incoming calls with rules assigned to the category.

17. An arrangement as claimed in claim 13, wherein the client application is arranged to block incoming and/or outgoing calls.

18. An arrangement as claimed in claim 13, wherein the client application is arranged to feature different profiles that contain different processing rules for incoming and outgoing calls.

19. An arrangement as claimed in claim 13, wherein the client application is arranged to pass calls through always from at least one certain specified number.

20. An arrangement as claimed in claim 13, wherein the client application is arranged to hang up intermittent phone calls and pass calls through from the call centre server.

21. An arrangement as claimed in claim 13, wherein the client application and/or the call centre server is arranged to maintain a call queue.

22. An arrangement as claimed in claim 21, wherein the client application and/or the call centre server is arranged to analyse priority of incoming calls in the call queue, and arranged to process the incoming calls to the mobile agent in the order of priority.

23. An arrangement as claimed in claim 13, wherein the mobile station is a GSM-, GSM-data, IP-RAN-, UMTS-, WAP-, Teldesic-, Inmarsat-, Iridium, GPRS-, CDMA-data-, WCDMA-data-, HTTP-, H.323-, SIP-, SMS-, MMS-, email- LAN-, TCP/IP-, imode-, Globalstar- and/or WLANcompliant mobile phone, PDA and/or a portable computer.

24. An arrangement as claimed in claim 13, wherein the call centre server comprises any of the following: database server, disk array, gateway server, application server, external phone centre, virtual phone and/or a SIP and/or H.323 phone.

25. A software program product comprising a software program stored on a computer readable memory unit for controlling availability of a mobile agent, comprising a client application arranged to be installed on a mobile station, the client application being arranged to wirelesly communicate data with call centre server software, the program product comprising instructions for:
controlling availability of the mobile agent to receive calls with the mobile station from at least one call centre, and processing a call to the mobile station by:
identifying, from among multiple, different profiles, a first profile set for the mobile station at a time when the call to the mobile station was received, each of the multiple, different profiles being associated with one or more call processing rules defined to control processing of calls received when the mobile station is set in the corresponding profile;
accessing a first call processing rule associated with the first profile and defined to control processing of calls received when the mobile station is set in the first profile, the first call processing rule being different than a second call processing rule defined to control processing of calls received when the mobile station is set in a second profile that is different than the first profile;
accessing one or more parameters that represent a state of a customer of the call centre server that is associated with the call to the mobile station and a state of the mobile station at a time when the call to the mobile station was received;
applying the first call processing rule to the accessed one or more parameters to determine an action to be taken for the call to the mobile station; and
performing the determined action on the call to the mobile station.

26. Software program product as claimed in claim 25, wherein the client application is arranged to programmatically produce a busy signal to an incoming call.

27. Software program product as claimed in claim 25, wherein the client application is arranged to define incoming calls to certain categories and process said incoming calls with rules assigned to the category.

28. Software program product as claimed in claim 25, wherein the client application is arranged to block incoming and/or outgoing calls.

29. Software program product as claimed in claim 25, wherein the client application is arranged to feature different profiles that contain different processing rules for incoming and outgoing calls.

30. Software program product as claimed in claim 25, wherein the client application is arranged to pass calls through always from at least one certain specified number.

31. Software program product as claimed in claim 25, wherein the client application is arranged to hang up intermittent phone calls and pass calls through from the call centre server.

32. Software program product as claimed in claim 25, wherein the client application is arranged to maintain a call queue.

33. Software program product as claimed in claim 32, wherein the client application is arranged to analyse priority of incoming calls in the call queue, and processes the incoming calls to the mobile agent in the order of priority.

34. Software program product as claimed in claim 25, wherein the client application is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email- LAN-, TCP/IP-, imode-, Globalstar- and/or WLAN-compliant mobile phone software application, PDA and/or a portable computer application.

35. A software program product comprising a software program stored on a computer readable memory unit for controlling availability of a mobile agent, comprising call centre server software arranged to wirelessly communicate data with a client application installed on a mobile station, the program product comprising instructions for:
controlling, by the call centre sever software, availability of the mobile agent to receive calls with the mobile station by controlling the client application on the mobile station of the mobile agent,
managing rules for processing incoming and outgoing calls stored in the client application by communicating wirelesly with the mobile station and the client application, and
processing a call to the mobile station by:
identifying, from among multiple, different profiles, a first profile set for the mobile station at a time when the call to the mobile station was received, each of the multiple, different profiles being associated with one or more call processing rules defined to control processing of calls received when the mobile station is set in the corresponding profile;
accessing a first call processing rule associated with the first profile and defined to control processing of calls received when the mobile station is set in the first profile, the first call processing rule being different than a second call processing rule defined to control processing of calls received when the mobile station is set in a second profile that is different than the first profile;

accessing one or more parameters that represent a state of a customer of the call centre server that is associated with the call to the mobile station and a state of the mobile station at a time when the call to the mobile station was received;

applying the first call processing rule to the accessed one or more parameters to determine an action to be taken for the call to the mobile station; and performing the determined action on the call to the mobile station.

36. Software program product as claimed in claim 35, wherein the call centre server software is arranged to maintain a call queue.

37. Software program product as claimed in claim 36, wherein the call centre server software is arranged to analyse priority of incoming calls in the call queue, and processes the incoming calls to the mobile agent in the order of priority.

38. Software program product as claimed in claim 35, wherein the call centre server software comprises any of the following: database server software, disk array software, gateway server software, application server software, external phone centre software, virtual phone software and/or a SIP and/or H.323 phone software.

* * * * *